(No Model.)

J. W. THORNBURG.
LAWN MOWER.

No. 578,666.  Patented Mar. 9, 1897.

Inventor
John W Thornburg,

Witnesses
By his Attorneys,

THE NORRIS PETERS CO., PHOTO-LITHO., WASHINGTON, D. C.

UNITED STATES PATENT OFFICE.

JOHN WILLIAM THORNBURG, OF GUYANDOTTE, WEST VIRGINIA.

LAWN-MOWER.

SPECIFICATION forming part of Letters Patent No. 578,666, dated March 9, 1897.

Application filed March 17, 1896. Serial No. 583,567. (No model.)

*To all whom it may concern:*

Be it known that I, JOHN WILLIAM THORNBURG, a citizen of the United States, residing at Guyandotte, in the county of Cabell and State of West Virginia, have invented a new and useful Lawn-Mower, of which the following is a specification.

My invention relates to lawn-mowers adapted for cutting grass, grain, weeds, &c.; and the object in view is to provide a simple, inexpensive, and efficient construction and arrangement of parts whereby a device of this class with a rotary cutter may be operated with facility to cut at any desired distance from the surface of the ground and whereby those parts which are liable to become worn or injured in use may be replaced at a small cost.

Further objects and advantages of this invention will appear in the following description, and the novel features thereof will be particularly pointed out in the appended claims.

Figure 1:
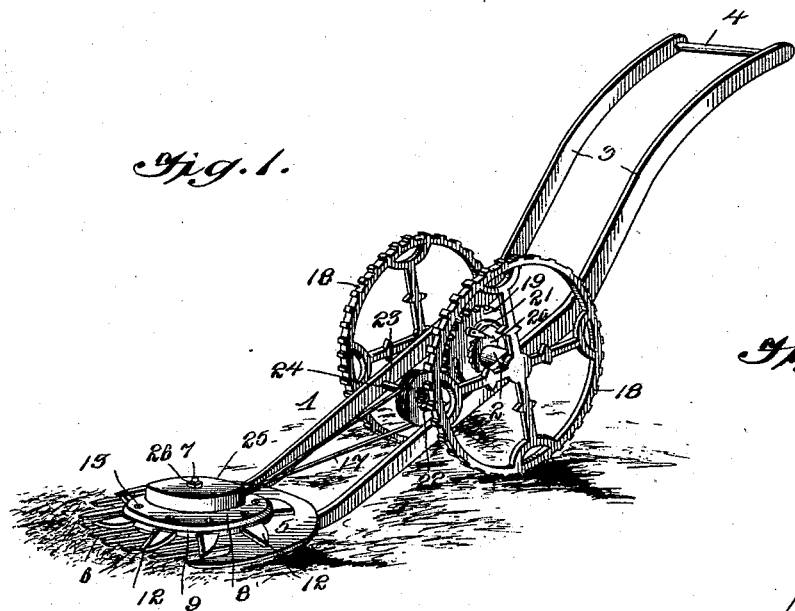
Figure 2:
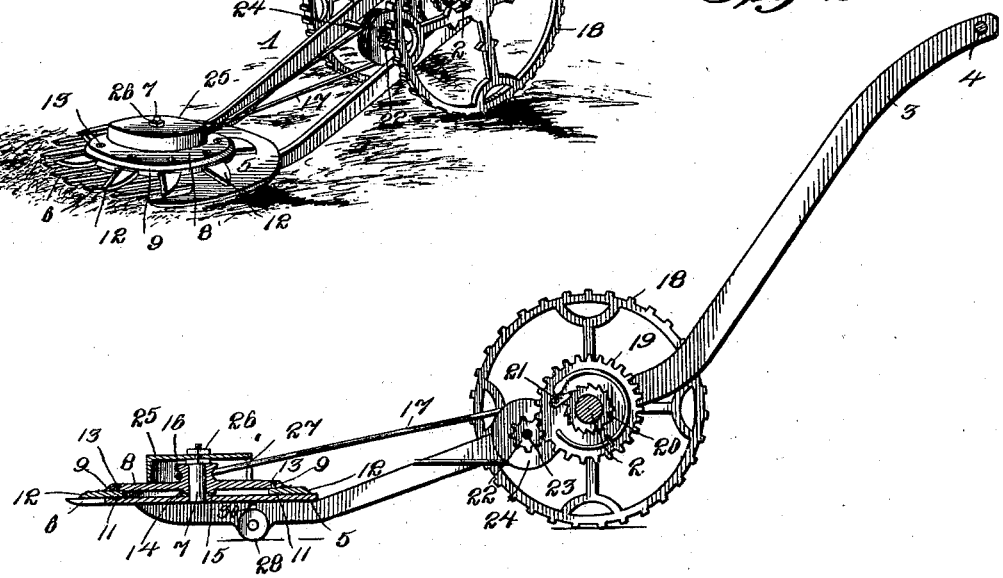
Figure 3:
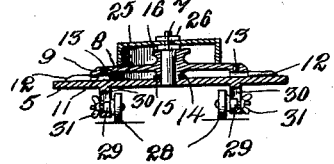
Figure 5:
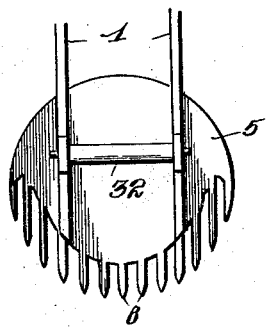
Figure 4:
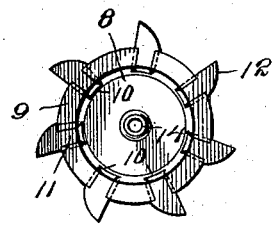

In the drawings, Figure 1 is a perspective view of a mower constructed in accordance with my invention. Fig. 2 is a longitudinal central section of the same. Fig. 3 is a detail transverse vertical section. Fig. 4 is a detail bottom plan view of the cutter-wheel. Fig. 5 is a bottom plan view showing a slightly-modified form of supporting-roll.

Similar numerals of reference indicate corresponding parts in all the figures of the drawings.

1 designates side arms which extend forwardly from the shaft or axle 2, and which in rear thereof form handle-bars 3, connected by a cross-bar 4, said side arms 1 extending forwardly and downwardly to a point below the plane of the finger-plate 5, and the finger-plate being rigidly secured to the horizontal front extremities of the side arms and being provided at its front edge with guard-fingers 6.

Rising centrally from the finger-plate is a stub-shaft 7, upon which is mounted a cutter-wheel 8, said cutter-wheel consisting of a disk or body portion having a peripheral depending rib 9, which is provided at intervals with cross-sectionally-dovetailed seats 10, in which fit the correspondingly-constructed shanks 11 of the knives 12. The shanks of the knives are secured in their seats by means of set-screws 13, which impinge against the upper surfaces of the shanks and thus force the latter downwardly or toward the reduced portions of the seat and thus lock the knives against displacement. This manner of mounting the knives also provides for radial adjustment to secure uniformity of projection of the knives. The disk forming the body portion of the wheel is provided with a depending hub 14 to bear upon a washer 15, fitted upon the stub-shaft and resting upon the upper surface of the finger-plate, and said hub is extended above the plane of the disk to form a pulley 16 for the belt 17 or its equivalent.

The construction above described of a disk having a peripheral depending rib in which the cross-sectionally-dovetailed knife-seats are formed enables the knives to be adjusted radially to secure the desired projection, as it may be desirable in case of operating upon a dense growth of grass to have the knives project but slightly. The formation of the seats in the depending rib 9 provides for the seats having open outer and inner ends, whereby when adjusted inwardly the extremities of the shanks may project through the inner ends of the seats and yet be concealed by the body portion or disk of the cutter-wheel. The knives are shown as parallel-sided and of even width throughout, except at their outer extremities, where they are reduced, as in the ordinary practice, to avoid carrying an unnecessary amount of metal at the extremities of the knives. The inner ends of these seats being below the plane of the body portion of the cutter-wheel, any projection of the knives will be concealed and protected. Furthermore, the construction above described provides for the adjustment and the efficient fastening of the knives at any desired extension without perforating or slotting the knives. I am aware that it is not broadly new to provide a cutting apparatus with either removable or adjustable knives; but by employing a cross-sectionally dovetailed seat in connection with a set-screw mounted in the broad side of the seat to force the knife toward the reduced side thereof the convergent walls of the seat, coacting with the correspondingly-beveled edges of the knife, enable me to firmly and efficiently secure a knife in place without weakening the latter by cutting away any of the intermediate portion of the same and also enable me to secure a more extended adjustment of a knife of a given length.

Secured to the extremities of the main shaft or axle are the ground or driving wheels 18, which are located at a less interval transversely than the width of the cutter-wheel, whereby said ground-wheels traverse the mown surface. Mounted upon the shaft or axle is a master-gear 19, connected by means of a clutch comprising a ratchet-wheel 20 and a pawl 21 with the shaft, whereby during the forward movement of the machine motion is communicated from the shaft to the gear, and this master-gear meshes with a pinion 22, having a transverse spindle 23, mounted in bearings in the frame and carrying a pulley 24 for the rear end of said belt.

It will be understood that while a belt is shown in the drawings as the means for communicating motion from the pulley on the spindle to the pulley on the cutter-wheel any other form of flexible connection or gearing may be adopted, and also that various other changes in the form, proportion, and the minor details of construction may be resorted to without departing from the spirit or sacrificing any of the advantages of this invention.

In order to protect the means for communicating motion to the cutter-wheel from falling grass or grain, I preferably arrange thereover a cap 25, fitted upon the upper reduced extremity of the stub-shaft and secured in place in contact with the shoulder at the lower portion of said reduced extremity by means of a nut 26, said cap being cut away at its rear side to form an opening 27, through which the flexible connection operates.

From the above description it will be seen that the construction is simple, and motion is communicated to the cutter-wheel by means of a minimum number of parts, whereby the machine is light-running and may be guided with facility.

In order to support the front end of the frame, and hence the finger-plate and cutter-wheel, at the desired elevation to leave stubble of any desired length, I employ a rotary supporting device or devices, of which the construction may differ according to the particular use for which the machine is built, the same being arranged under for protection by the finger-plate. For heavy work I preferably employ the construction of supporting devices illustrated in Figs. 1, 2, and 3, the same consisting of rollers or wheels 28, having stub-shafts 29, which fit in vertical slots 30 in the front extremities of the side arms and are secured at the desired adjustment by means of set-screws 31 or their equivalents, said rollers being adapted to travel upon the surface of the ground between the stubble, which is too stiff to be flattened, whereas in light work a single transverse roller mounted between the front extremities of the side arms, as shown at 32 in Fig. 5, is sufficient for the purpose, said roller traveling over and flattening the stubble. Furthermore, the cap 25, in addition to covering and protecting the pulley which is traversed by the operating-belt 17, serves to hold the cutter-wheel in operative relation with the finger-plate, the lower edge of the flange of said cap being arranged contiguous to the upper surface of said wheel. Hence, as the cap is removably attached to the upper reduced end of the stub-shaft, it is adapted to preserve the operative relations of the parts when secured in place and release the cutter-wheel when detached.

Having described my invention, what I claim is—

1. The combination of a supporting-frame, a main shaft carrying ground-wheels, a finger-plate adapted to operate contiguous to and parallel with the surface of the ground, a stub-shaft rising centrally from the finger-plate, a cutter-wheel mounted upon the stub-shaft above and supported by the surface of the plate and having at its upper side a pulley, a cap removably fitted upon the upper reduced end of the stub-shaft to cover the pulley and having a depending flange surrounding the pulley and terminating contiguous to the upper surface of the cutter-wheel, said cap being provided in the rear side of its flange with an opening, means for securing the cap to the stub-shaft and thereby holding the cutter-wheel in operative relation with the finger-plate, and an operating-belt extending through the opening in the rear side of the cap and traversing the inclosed pulley, substantially as specified.

2. A rotary cutter-wheel provided near its periphery with cross-sectionally-dovetailed parallel-sided seats open at their outer ends and at their lower reduced sides, imperforate knives having shanks shaped cross-sectionally to correspond with and fitted in said seats, and set-screws mounted in the wheel and impinging terminally against the broad or enlarged upper sides of said shanks to force the same toward the reduced or lower sides of the seats and secure the knives firmly against displacement, substantially as specified.

3. The combination with a supporting-frame and ground-wheels, of a finger-plate, a stub-shaft rising vertically from the finger-plate, a cutter-wheel mounted upon said stub-shaft and having a disk or body portion provided with a depending peripheral rib, said peripheral rib being provided at intervals with cross-sectionally-dovetailed parallel-sided seats which are open at their lower sides and at their outer and inner ends, knives having cross-sectionally-dovetailed parallel-sided shanks fitted in said seats and capable of radial adjustment, said shanks being adapted to project terminally through the open inner ends of the seats below the plane of the body portion of the cutter-wheel, and means, as set-screws mounted in the body portion of the wheel and impinging terminally against the broad or enlarged upper sides of the shanks, for securing the knives against radial displacement and holding them at the desired adjustment, and means for communicating motion from the ground-wheels to the cutter-wheel, substantially as specified.

In testimony that I claim the foregoing as my own I have hereto affixed my signature in the presence of two witnesses.

JOHN WILLIAM THORNBURG.

Witnesses:
GEO. MCCUNE,
S. C. HERMEN.